(12) United States Patent
Cheetham

(10) Patent No.: US 6,824,100 B1
(45) Date of Patent: Nov. 30, 2004

(54) AIRPLANE LANDING GEAR

(75) Inventor: Carl T. Cheetham, Casper, WY (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/641,817

(22) Filed: Aug. 15, 2003

(51) Int. Cl.$^7$ .............................................. B64C 25/10
(52) U.S. Cl. ............................... 244/102 R; 244/102 SS
(58) Field of Search .................... 244/100 R, 102 R, 244/102 A, 102 SL, 102 SS

(56) References Cited

U.S. PATENT DOCUMENTS

| | | | | |
|---|---|---|---|---|
| 2,478,729 A | * | 8/1949 | Westcott, Jr. .......... | 244/102 SS |
| 2,659,555 A | * | 11/1953 | Schlender ............... | 244/102 R |
| 3,904,153 A | * | 9/1975 | Watts ........................ | 244/50 |
| 3,954,232 A | * | 5/1976 | Harper .................... | 244/102 R |
| 4,047,681 A | * | 9/1977 | Hartel .................... | 244/102 SS |
| 4,228,975 A | * | 10/1980 | Sealey .................... | 244/102 R |
| 4,586,682 A | * | 5/1986 | Veaux et al. ............. | 244/102 R |
| 4,770,372 A | * | 9/1988 | Ralph ..................... | 244/102 R |
| 4,907,760 A | * | 3/1990 | Sealey et al. ........... | 244/100 R |
| 5,022,609 A | * | 6/1991 | Cranston ................ | 244/102 R |
| 5,039,033 A | * | 8/1991 | Woerner et al. ........ | 244/102 R |
| 5,058,827 A | * | 10/1991 | Dansereau et al. ..... | 244/103 R |
| 5,100,083 A | * | 3/1992 | Large et al. ........... | 244/102 SS |
| 5,299,761 A | * | 4/1994 | Robin et al. ........... | 244/102 SS |
| 5,429,323 A | * | 7/1995 | Derrien et al. ......... | 244/102 R |
| 5,908,174 A | | 6/1999 | Churchill et al. | |
| 6,129,310 A | * | 10/2000 | Squires et al. .......... | 244/102 R |
| 6,131,852 A | * | 10/2000 | Holloway ..................... | 131/32 |
| 6,481,668 B2 | * | 11/2002 | Grossman ............... | 244/102 R |
| 2003/0102406 A1 | * | 6/2003 | Chow et al. ............ | 244/100 R |

OTHER PUBLICATIONS

Department of Transportation, Federal Aviation Administration, Airworthiness Directives; BAE Systems (Operations) Limited (Jetstream) Model 4101 Airplanes; 14 CFR Part 39, Docket No. 2001–NM–151–AD; Federal Register: Sep. 25, 2001 (vol. 66, No. 186).
Photograph of Concord Landing Gear; BAC System Drawing; http://www.concordesst.com/graphics/gear/maingear-big.gif; Sep. 24, 2002.

* cited by examiner

Primary Examiner—Michael J. Carone
Assistant Examiner—Stephen Holzen
(74) Attorney, Agent, or Firm—Thomas F. Lebens; Fitch, Even, Tabin & Flannery

(57) ABSTRACT

In one embodiment the present invention includes a landing gear for an airplane comprising a plurality of connectors coupled to the airplane; a first support member coupled to at least one of the plurality of connectors; a second support member pivotally coupled to the first support member; a third support member pivotally coupled to the second support member; a wheel coupled to the third support member; a bell crank coupled to the third support member; and a link system coupled to the bell crank; wherein the third support member folds back upon the second support member and moves aft upon retraction of the landing gear into the airplane.

9 Claims, 8 Drawing Sheets

AIRPLANE LANDING GEAR

BACKGROUND OF INVENTION

1. Field of the Invention

The present invention relates generally to landing gear for airplanes. More specifically, but without limitation thereto, the present invention relates to airplanes which have landing gear that folds upon retraction.

2. Discussion of the Background Art

Airplane landing gear generally is designed such that the landing gear is retracted into the plane through a wheel well door which opens and closes with the extraction and retraction of the landing gear. The wheel well opening on conventional systems is longer than that of the landing gear and thus there is no problem retracting the landing gear up into the wheel well after take off. However, some airplanes have the need for a landing gear which is longer than the wheel well opening. Redesign of the wheel well to accommodate a lengthened landing gear may not be a viable option due to the increased cost of redesigning the wheel well.

One solution to this problem, as shown in the prior art, is to have a landing gear with sliding rods which shorten upon retraction. For example, U.S. Pat. No. 5,429,323 shows a landing gear system with multiple sliding rods. As the landing gear is retracted the sliding rods shorten enabling the landing gear to fit inside of the wheel well. However, this is a very complex solution which has limited access for repairs and inspection. Additionally, the landing gear is limited in the amount of length in which it can shorten by the sliding rods.

Thus there is a need for landing gear that eliminates the problems discussed above, as well as other problems.

SUMMARY OF INVENTION

The present invention advantageously addresses the needs above as well as other needs by providing an airplane landing gear that folds upon retraction.

In one embodiment, the present invention includes a landing gear for an airplane comprising a first support member; a second support member coupled to the first support member through a first pivot point, and a third support member coupled to the second support member through a second pivot point; wherein the second support member folds back upon the first support member as the landing gear is retracted into a wheel well; wherein the third support member folds back upon the first support member and moves aft as the landing gear is retracted into the wheel well.

In another embodiment, the invention can be characterized as landing gear for an airplane comprising: a plurality of connectors for mounting the landing gear to an airplane; a support structure coupled to the plurality of connectors; a shock strut coupled to the support structure through a bell crank; and a plurality of wheels coupled to the shock strut; wherein the bell crank rotates moving the shock strut aft during retraction of the landing gear.

In yet another embodiment, the invention advantageously includes a method of retracting landing gear comprising the steps of actuating a hydraulic member; causing a first support member to rotate in a first direction about a first pivot point in response to actuating the hydraulic member; causing a second support member to rotate in a second direction about a second pivot point in response to actuating the hydraulic member; and causing a third support member to rotate in the second direction about a third pivot point; causing the third support member to move aft during the rotation about the third pivot point.

In a subsequent embodiment, the invention advantageously includes a landing gear for an airplane comprising a plurality of connectors coupled to the airplane; a first support member coupled to at least one of the plurality of connectors; a second support member pivotally coupled to the first support member; a third support member pivotally coupled to the second support member; a wheel coupled to the second support member; a bell crank coupled to the third support member; and a link system coupled to the bell crank; wherein the second support member folds back upon the first support member and moves aft upon retraction of the landing gear into the airplane.

BRIEF DESCRIPTION OF DRAWINGS

The present invention is illustrated by way of example and not limitation in the accompanying figures, in which like references indicate similar elements, and in which.

Figure 1:
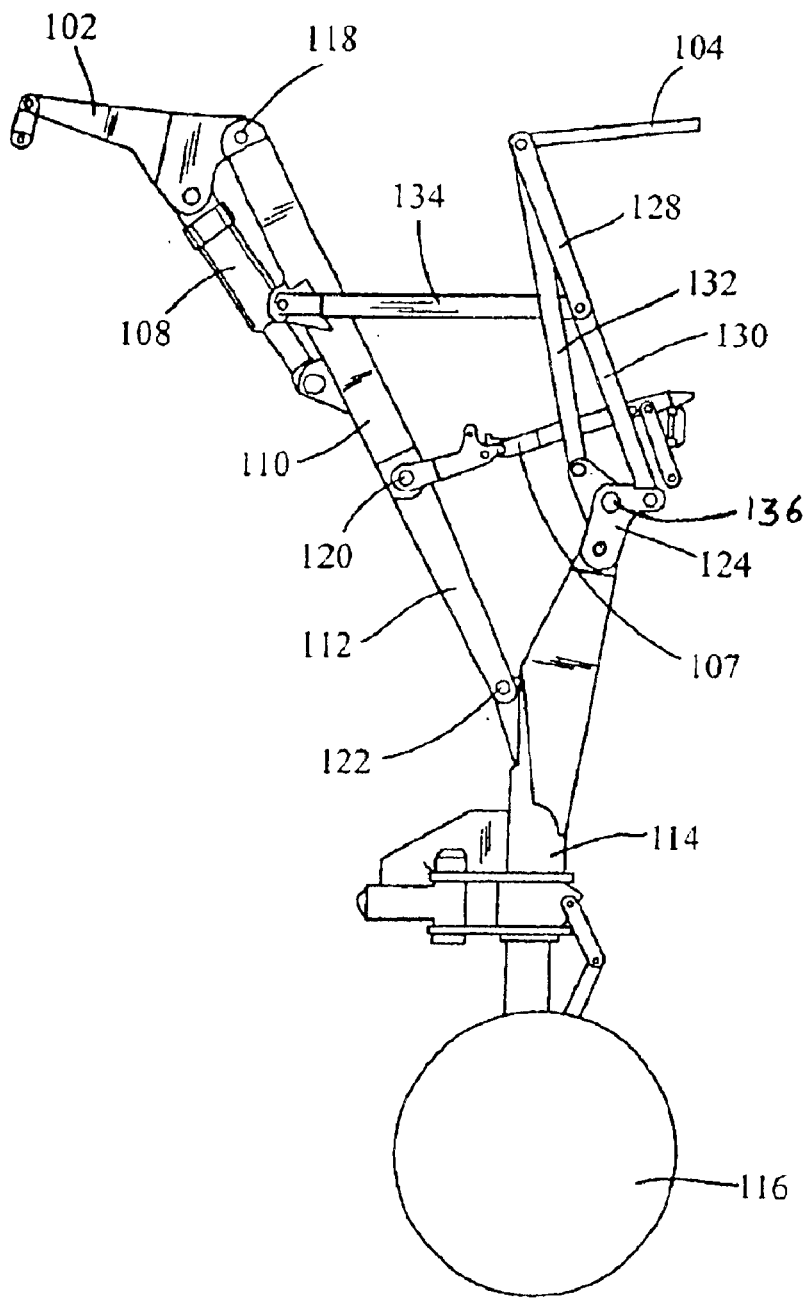
FIG. 1 illustrates a side view of a landing gear in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

The present invention provides for a foldable landing gear mechanism for an airplane. In one embodiment of the present invention, a standard wheel well is used while the landing gear has been extended in length. The extended landing gear has pivot points that allow the landing gear to collapse upon itself upon retraction into the standard wheel well. In one embodiment no internal changes to the shock strut from traditional landing gear are required. Additionally, there is no need for additional hydraulic actuators, thus making the present design very cost effective. In one design, the present invention includes a bell crank that rotates and pulls the shock strut toward the aft of the wheel well.

One example of the present invention can be applied to the 767 Military Tanker. Due to the design of the aircraft, the 767 requires a nose landing gear that is fifteen inches taller than standard landing gear. On option is to redesign both the wheel well and the landing gear, however, redesign of the wheel well is very costly. Thus, landing gear that is fifteen inches taller and fits into the standard wheel well is provided such that there will not be a great increased costs associated with redesigning the entire wheel well.

Another example of the present invention could be used in commercial and private airplanes. The present invention would allow for a smaller wheel well, providing for more space within the airplane body for other uses. In the present embodiment the landing gear includes a bell crank which rotates as the landing gear folds upon itself. The rotation of the bell crank moves part of the landing gear toward the aft of the airplane, thus allowing for a longer landing gear to fit into the standard wheel well.

In another embodiment of the present invention the landing gear shown is longer than the available wheel well opening. Thus, the landing gear will not fit through the wheel well opening while being rotated into the wheel well. In order to solve this problem, as the landing gear is rotated into the wheel well, in accordance with the present embodiment, a set of links, pivots and bell-cranks allow the landing gear to fold upon itself. This allows the landing gear to fit through the wheel well opening. Advantageously, a standard wheel well design can be used to accommodate a longer landing gear.

FIGS. 1 through 8 show an airplane landing gear in accordance with the present invention. Shown is a first connector 102, a second connector 104, a third connector 106, a fourth connector 107, a fifth connector 103, a hydraulic actuator 108, a first support member 110, a second support member 112, a third support member 114, a plurality of wheels 116, a first support pivot point 118, a second support pivot point 120, a third support pivot point 122, a first bell crank 124, a second bell crank 126, a bell crank pivot point 136, a first link member 128, a second link member 130, a third link member 132, and a fourth link member 134.

The airplane landing gear is made from number of different materials including, for example, alloy steel (HT>220KSI), forged aluminum, corrosion resistant steel, and titanium.

Figure 4:
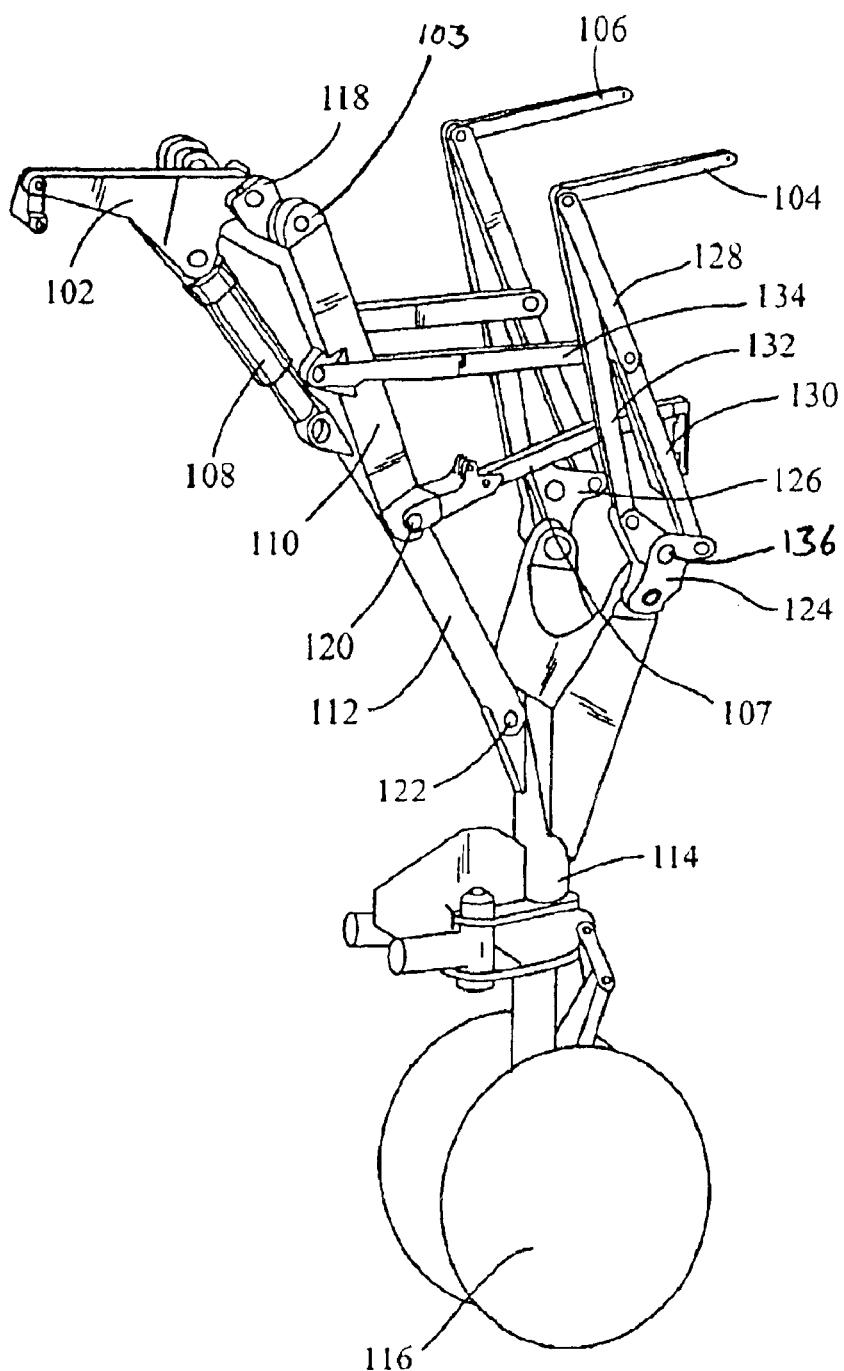
FIG. 4 illustrates an isometric view of the landing gear of FIG. 1.

As is best shown in FIG. 4, the first connector 102, the second connector 104, the third connector 106, the fourth connector 107, and the fifth connector 103 secure the landing gear to the airplane (not shown). The hydraulic actuator 108 is pivotally coupled to both the first connector 102 and the first support member 110. The first connector 102 is pivotally coupled to the first support member 110 at the first support pivot point 118. The first support member 110 is pivotally coupled to the second support member 112 at the second support pivot point 120. The second support member 112 is pivotally coupled to the third support member 114 at the third support pivot point 122. The third support member 114 is coupled to the wheel 116.

Figure 2:
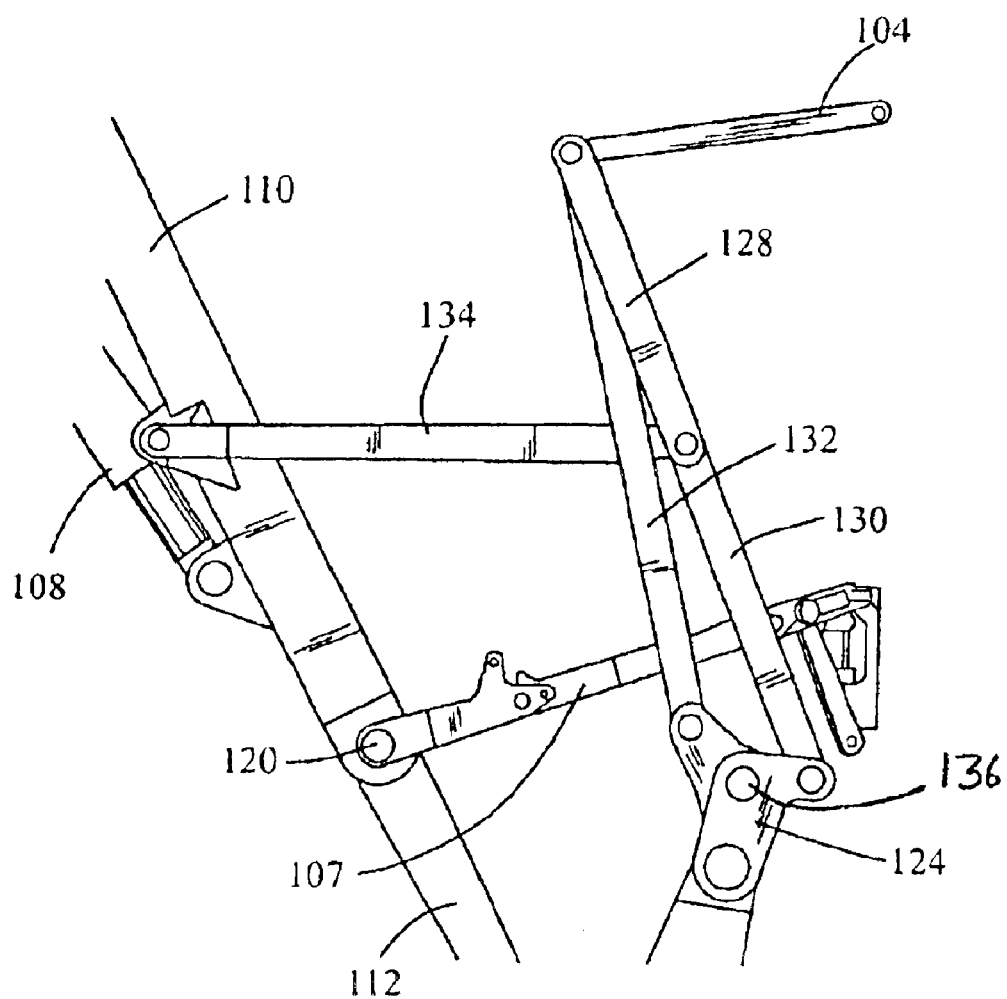
FIG. 2 illustrates a partial side view of a portion of the landing gear of FIG. 1.

As is best shown in FIG. 2, the second connector 104 is pivotally coupled to the first link member 128. The first link member is pivotally coupled to the second link member 130, the third link member 132, and the fourth link member 134. The second link member 130 and the third link member 132 are coupled to the first bell crank 124. The first link member 128, the second link member 130, the third link member 132 and the fourth link member 134 will be referred to herein as a link system.

The link system, best shown in FIG. 2, provides structural support for the landing system and helps guide the landing gear into the wheel well. When the landing gear is extracted, such as when an airplane is on the ground, the link system provides structural support for the landing gear. As the landing gear is retracted into the wheel well the link system aids in the folding of the landing gear. As the first support member 110 moves up, the fourth link member 134 moves with the first support member 110 causing the first link member 128 and the second link member 130 to move aft and upward. At the same time the third link member 132 causes the first bell crank 124 to rotate at the bell crank pivot point 136. The rotation of the first bell crank 124 causes the third support member 114 to move aft, i.e., toward a back of the airplane, thus allowing the lengthened landing gear to fit into the standard wheel well. The lengthened landing gear would not fit into the standard wheel well unless the third support member 114 moved toward the back of the airplane because the wheels 116 would not clear the front of the wheel well during retraction Advantageously, numerous alternative designs are also contemplated in which the link system provides support for the landing gear while still allowing for the rotation of the first bell crank 124. Prior landing gear systems do not include the first bell crank 124 or the second bell crank 126 which moves the third support member 114 aft during the retraction of the landing gear. The rotation of the bell crank 124 allows for the landing gear to be lengthened while still being able to clear the front of the wheel well as the landing gear is being retracted into the wheel well.

In prior designs the link system was connected directly to the third support member 114. In accordance with the present embodiment, the bell crank 124 has been added. The bell crank 124 adds approximately an additional 7.5 inches to the length of the landing gear. Additionally, the third support member 114 has been lengthened by 7.5 inches as compared to prior landing gear designs. The landing gear still fits into the standard wheel well because as the landing gear is retraced the bell crank 124 rotates causing the third support member 124 to move aft as compared to the prior landing gear.

The fourth connector 107 is attached at one end to the second support pivot point 120 and is attached at the opposite end to the airplane. The fourth connector 107 locks the landing gear into place when the landing gear is in an up position or a down position.

Figure 6:
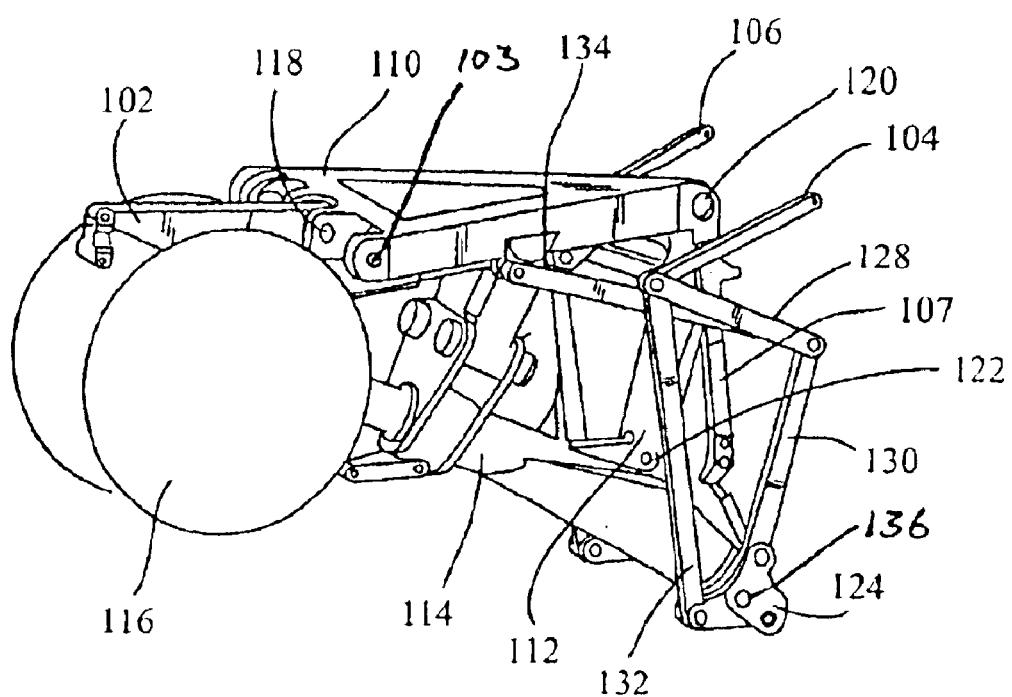
FIG. 6 illustrates an isometric view of the landing gear of FIG. 1 after the landing gear has been retracted.
Figure 7:
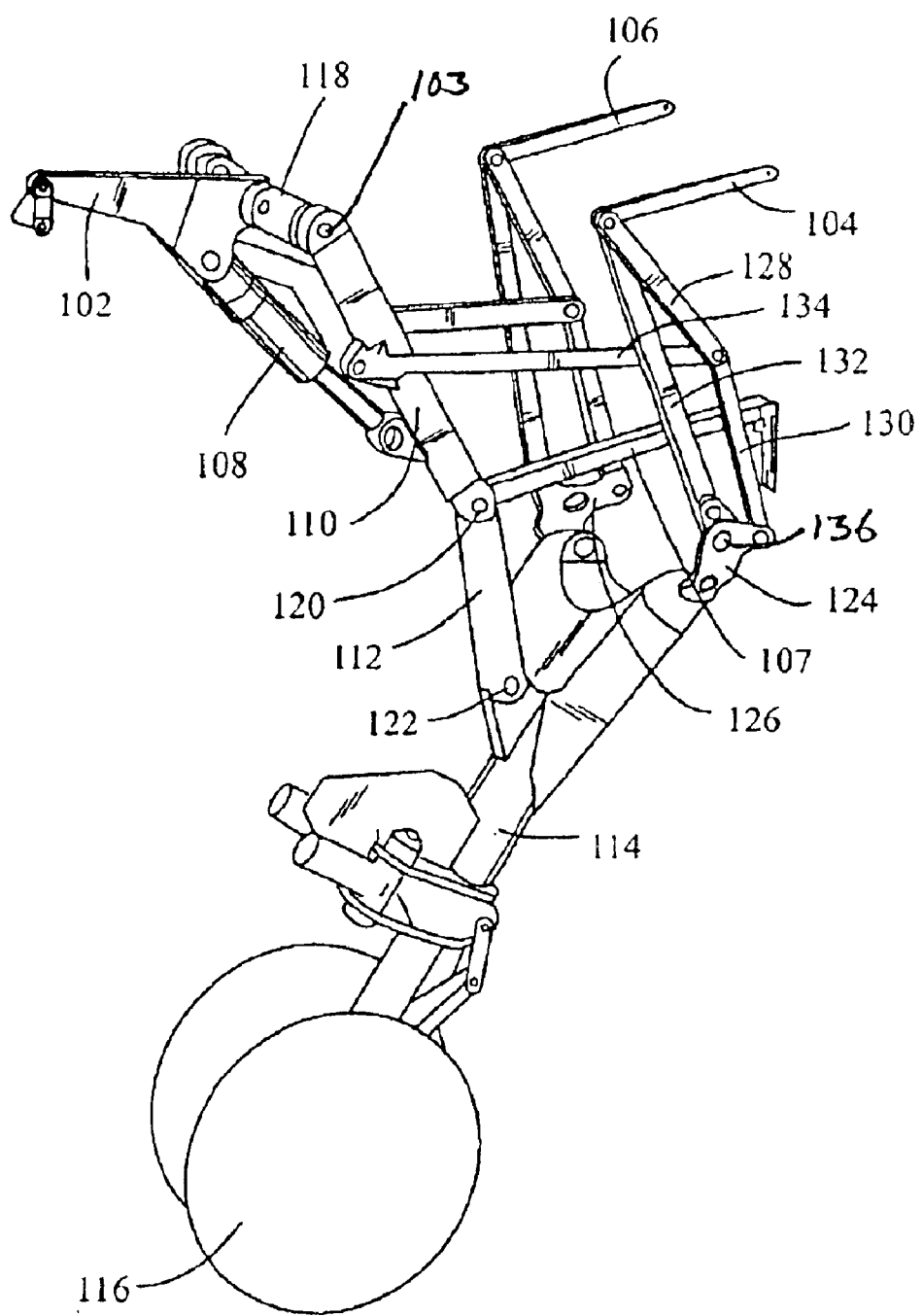
FIG. 7 illustrates an isometric view of the landing gear of FIG. 1 after the landing gear has been partially retracted.
Figure 8:
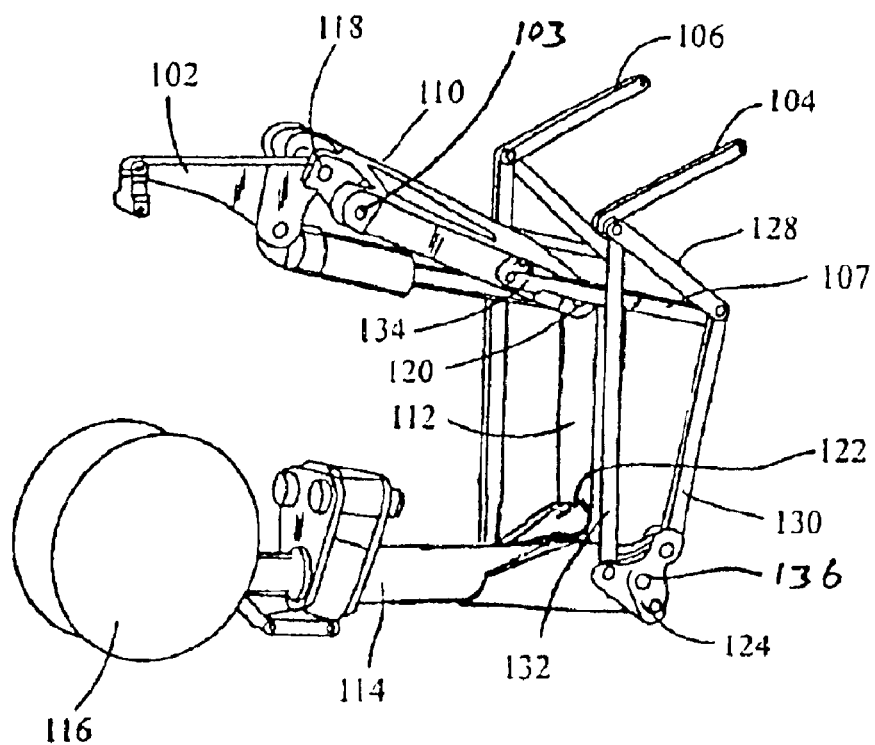
FIG. 8 illustrates an isometric view of the landing gear of FIG. 1 after the landing gear has been partially retracted.

Advantageously, the landing gear is designed to fold on itself when retracted into the wheel well. FIG. 4 shows an isometric view of the landing gear extended, such as when the airplane is on the ground. FIG. 6 shows an isometric view of the landing gear once it has been retracted into the wheel well. As is shown the landing gear is folded upon itself. FIGS. 7 and 8 both show isometric views of the landing gear partially retracted into the wheel well. As can be seen from the combination of the figures, the bell crank 124 rotates as the landing gear is retracted into the wheel well and moves the third support member 114 toward the back of the wheel well. This moves the third support member 114 into previously unused space present in the standard wheel well that is used in prior landing gear designs.

Figure 5:
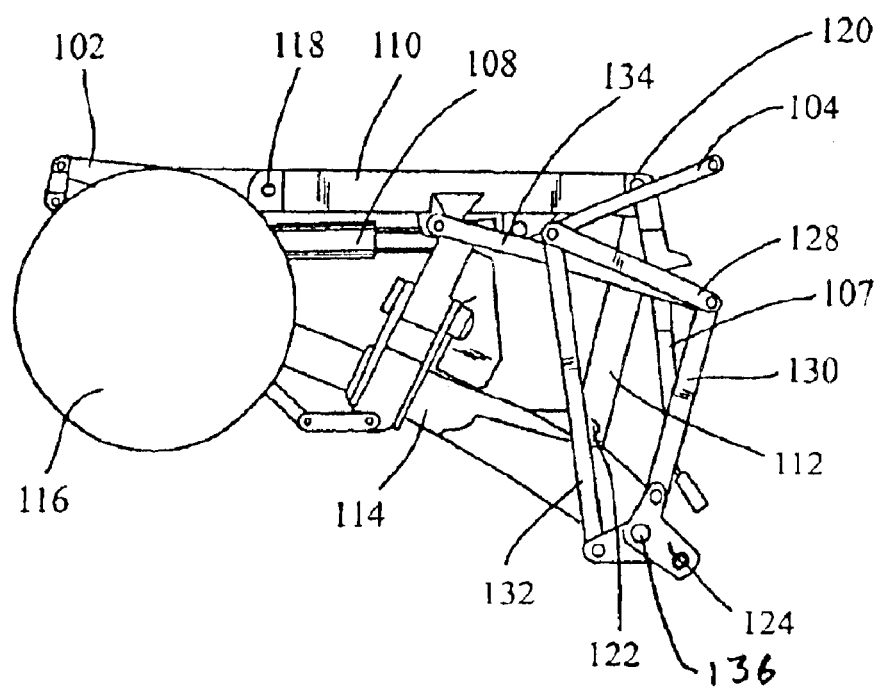
FIG. 5 illustrates a side view of the landing gear of FIG. 1 after the landing gear has been retracted.

When the landing gear is retracted into the wheel well the hydraulic actuator 108 extends, causing the first support member 110 to move upward at the second support pivot point 120. This causes the second support member 112 and the third support member 114 to move upward. As the third support member 114 moves upward the link system causes the third support member 114 to fold back upon the first support member 110 as well as causing the first bell crank 124 to rotate around the bell crank pivot point 136. The rotation of the first bell crank 124 causes the third support member 114 to move aft (toward the back of the wheel well) as it is folding back upon the first support member. This allows for a lengthened landing gear which can rotate into the standard wheel well without contacting the front of the wheel well upon retraction. When the first support member 110 reaches a position that is substantially horizontal the third support member 114 is folded back upon the first support member 110, such as is shown in FIGS. 4 and 5.

Figure 3:
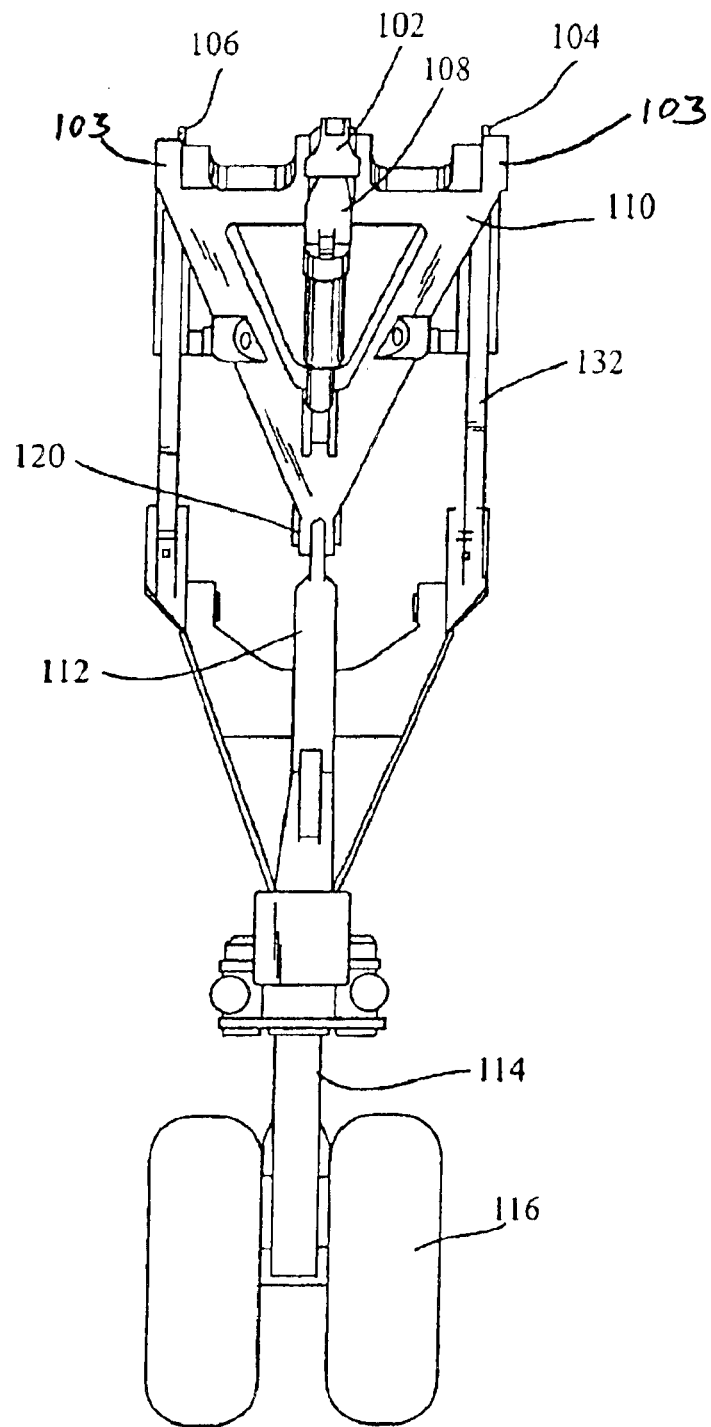
FIG. 3 illustrates a front view of the landing gear of FIG. 1.

The first support member 110, as shown best in FIGS. 6 and 3, is substantially in the shape of a triangle. The first support member 110 has the first support pivot point 118 at an upper end and the second support pivot point 120 at the opposite end. The first support member 110 provides structural support for the landing gear and aids in the folding feature of the present invention. Advantageously, the shape of the first support member 110 is not critical to the invention and many different designs for the support member could be used in accordance with the present invention.

The second support member 112, as is best shown in FIG. 4, is substantially straight and has the second support pivot point 120 at an upper end and the third support pivot point 122 at the opposite end. The second support member 112 provides structural support for the landing gear and aids in the folding feature of the present invention. The shape of the second support member 112 is not critical to the invention and many different designs for the support member could be used in accordance with the present invention.

The third support member 114 is pivotally coupled to the second support member 112 at the third support pivot point 122. Additionally, the third support member 114 is coupled to the wheel 116. The third support member 114 is additionally coupled to the link system though the first bell crank 124 and the second bell crank 126. The first bell crank 124 and the second bell crank 126 rotate about the bell crank pivot point 136.

In one embodiment the third support member 114, as is best shown in FIGS. 1, 3 and 4, is a shock strut. The shock strut is a standard shock strut as is known in the art. The shock strut provides for shock absorption when the airplane is landing and taking off. However, it should be apparent from the present invention that the third support member 114 could be many different designs and is not limited to the shock strut.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A landing gear for an airplane comprising:

a first support member;

a second support member coupled to the first support member through a first pivot point;

a third support member coupled to the second support member through a second pivot point;

a bell crank coupled to the third support member;

a hydraulic actuator for retracting the landing gear into the wheel well;

wherein the third support member folds back upon the first support member as the landing gear is retracted into a wheel well;

wherein the bell crank rotates as the landing gear is retracted into the wheel well moving the third support member toward the back of the wheel well;

wherein the hydraulic actuator is extended upon the retraction of the landing gear into the wheel well.

2. The landing gear of claim 1 further comprising a link system for causing the third support member to fold back upon the first support member.

3. The landing gear of claim 1 wherein the third support member is a shock strut.

4. The landing gear of claim 3 further comprising a plurality of wheels coupled to third support member.

5. A landing gear for an airplane comprising:

a first support member;

a second support member coupled to the first support member through a first pivot point;

a third support member coupled to the second support member through a second pivot point;

a bell crank coupled to the third support member;

wherein the third support member folds back upon the first support member as the landing gear is retracted into a wheel well;

wherein the bell crank rotates as the landing gear is retracted into the wheel well moving a portion of the third support member attached to the bell crank toward the back of the wheel well.

6. The landing gear of claim 5 further comprising a link system for causing the third support member to fold back upon the first support member.

7. The landing gear of claim 5 further comprising a hydraulic actuator for retracting the landing gear into the wheel well.

8. The landing gear of claim 7 wherein the hydraulic actuator is extended upon the retraction of the landing gear into the wheel well.

9. The landing gear of claim 5 wherein the third support member is a shock strut.

* * * * *